(No Model.)

E. A. CRAIG.
FEED TROUGH.

No. 333,604. Patented Jan. 5, 1886.

WITNESSES
M. E. Fowler
J. C. Garner

INVENTOR:—
Elizabeth A. Craig;
By C. A. Snow & Co.
her Attorneys

UNITED STATES PATENT OFFICE.

ELIZABETH A. CRAIG, OF ARLINGTON, KANSAS.

FEED-TROUGH.

SPECIFICATION forming part of Letters Patent No. 333,604, dated January 5, 1886.

Application filed September 16, 1885. Serial No. 177,271. (No model.)

*To all whom it may concern:*

Be it known that I, ELIZABETH A. CRAIG, a citizen of the United States, residing at Arlington, in the county of Reno and State of Kansas, have invented a new and useful Improvement in Feed-Troughs, of which the following is a specification, reference being had to the accompanying drawings.

My invention relates to an improvement in feed and water troughs for poultry, hogs, &c.; and it consists in the peculiar construction that will be more fully set forth hereinafter, and particularly pointed out in the claim.

Figure 1:
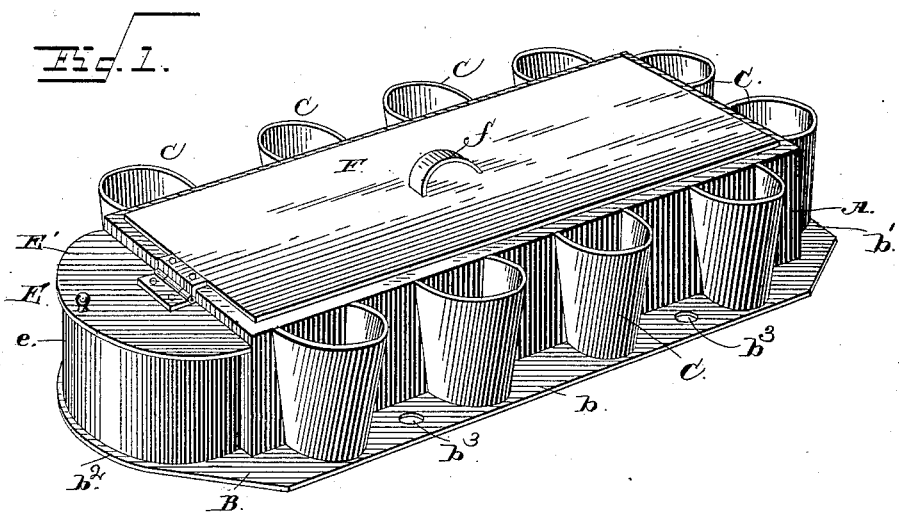
Figure 2:
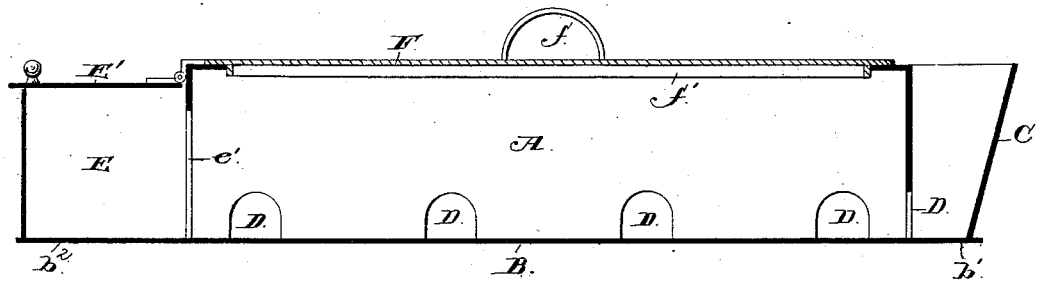
Figure 3:
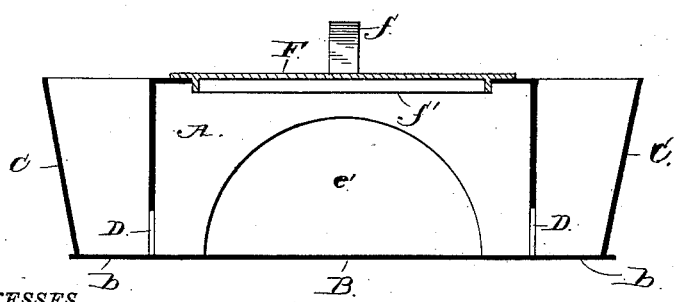

In the drawings, Figure 1 is a perspective view of a trough embodying my invention. Fig. 2 is a vertical longitudinal sectional view, and Fig. 3 is a vertical cross-sectional view, of the same.

A is a rectangular vessel, preferably made of sheet or cast iron, and having openings D in its sides and one end. The bottom B projects beyond the sides and ends as at $b$ $b'$ and $b^2$. The projection $b$ is provided with holes $b^3$, through which stakes may be driven to secure the vessel to the ground. On the projecting portions $b$ and $b'$ of the bottom, and surrounding the openings D, are cups C, which communicate with the interior of the vessel through the said openings D. The end $b^2$ of the bottom is semicircular, and has a vertical curved wall, $e$, forming an extension, E, of the vessel, and communicating therewith through an opening, $e'$, in the end wall of the latter. The extension E has a hinged lid, E', and the vessel A has a removable cover, F, having a handle, $f$, and a depending flange, $f'$, to enable it to fit tightly between the walls of the vessel. Feed or water for the fowls or hogs is poured into the extension E, and passes into the vessel A, and can be reached by the fowls or hogs only through the cups, thus preventing them from crowding each other, and from tramping in the water or feed with their feet. Hot or cold feed or slops may be thus fed.

A feed or water trough thus constructed is cheap and simple, prevents waste of the feed, and is very useful in a poultry-yard or hog-pen.

Having thus described my invention, I claim—

A feed-trough consisting of the vessel A, having the cover F, the bottom B, projecting beyond the sides and ends, as shown, the cups C on the sides and one end, and communicating with the interior through openings D, and the extension E on the other end of the vessel and communicating therewith through opening $e'$, said extension having the cover E', substantially as described.

In testimony that I claim the foregoing as my own I have hereto affixed my signature in presence of two witnesses.

ELIZABETH A. CRAIG.

Witnesses:
 JOHN W. CRAIG,
 R. J. GRAHAM.